(12) United States Patent
Arendell

(10) Patent No.: US 9,337,667 B2
(45) Date of Patent: May 10, 2016

(54) EXTERNAL ADAPTER FOR BATTERY PACK USED TO POWER A PORTABLE DEVICE

(71) Applicant: Motorola Solutions, Inc., Schaumburg, IL (US)

(72) Inventor: Scott J. Arendell, Buford, GA (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 598 days.

(21) Appl. No.: 13/781,103

(22) Filed: Feb. 28, 2013

(65) Prior Publication Data

US 2014/0239895 A1 Aug. 28, 2014

(51) Int. Cl.
*H02J 7/00* (2006.01)
*H01M 2/10* (2006.01)
*H01M 2/34* (2006.01)
*H01M 10/42* (2006.01)

(52) U.S. Cl.
CPC .............. *H02J 7/00* (2013.01); *H01M 2/1005* (2013.01); *H01M 2/1022* (2013.01); *H01M 2/34* (2013.01); *H01M 10/425* (2013.01); *H01M 10/4257* (2013.01); *A45F 2200/0516* (2013.01); *H02J 7/0063* (2013.01)

(58) Field of Classification Search
CPC ................................. H01R 13/533; H02J 7/00
USPC ............................ 320/112, 118, 137; 307/150
See application file for complete search history.

(56) References Cited

U.S. PATENT DOCUMENTS

| | | | |
|---|---|---|---|
| 5,504,411 A | 4/1996 | McCaleb et al. | |
| 5,592,064 A | 1/1997 | Morita | |
| 5,644,211 A | 7/1997 | Tokuyama | |
| 5,738,954 A | 4/1998 | Latella et al. | |
| 5,826,958 A | 10/1998 | Avitan | |
| 5,963,019 A * | 10/1999 | Cheon ................. | H02H 7/18 320/134 |
| 6,392,387 B1 | 5/2002 | Sage et al. | |
| 6,414,465 B1 | 7/2002 | Banks et al. | |
| 6,914,415 B2 | 7/2005 | Bohne et al. | |
| 7,068,012 B1 * | 6/2006 | Geren ................. | H01M 2/348 320/134 |
| 7,145,313 B2 | 12/2006 | Geren et al. | |

(Continued)

FOREIGN PATENT DOCUMENTS

| EP | 2131412 A2 | 12/2009 |
|---|---|---|
| EP | 2355300 A2 | 8/2011 |

(Continued)

OTHER PUBLICATIONS

Corresponding International application No. PCT/US2014-016675 International Search report and Written Opinion dated Oct. 14, 2014.

(Continued)

*Primary Examiner* — Kenneth B Wells
*Assistant Examiner* — James P Evans
(74) *Attorney, Agent, or Firm* — Scott M. Garrett; Barbara R. Doutre

(57) ABSTRACT

Embodiments include a rechargeable battery pack, system, and power adapter that allow the rechargeable battery pack to both power a host device though a set of host contacts and provide power, through the power adapter, via a set of charging contacts that interface with the power adapter. The power adapter contains a voltage source which activates a control circuit to disable a discharge protection circuit in the battery pack to allow current to discharge through the charging contacts.

20 Claims, 3 Drawing Sheets

(56) References Cited

U.S. PATENT DOCUMENTS

| | | | |
|---|---|---|---|
| 7,629,766 B2 | 12/2009 | Sadow | |
| 7,659,692 B2 | 2/2010 | Sainomoto et al. | |
| 8,035,346 B2 * | 10/2011 | Tsai | H02J 7/0029 320/134 |
| 8,044,814 B2 | 10/2011 | Bruce et al. | |
| 8,098,051 B2 | 1/2012 | Litingtun et al. | |
| 8,148,946 B2 * | 4/2012 | Takeda | H01M 10/443 320/134 |
| 2004/0017177 A1 * | 1/2004 | Santana, Jr. | B25F 5/02 320/114 |
| 2004/0116164 A1 | 6/2004 | Beguet et al. | |
| 2004/0160210 A1 | 8/2004 | Bohne et al. | |
| 2005/0073282 A1 | 4/2005 | Carrier et al. | |
| 2007/0072474 A1 | 3/2007 | Beasley et al. | |
| 2007/0105010 A1 | 5/2007 | Cassidy | |
| 2008/0012526 A1 | 1/2008 | Sadow | |
| 2009/0051316 A1 | 2/2009 | Park et al. | |
| 2009/0115372 A1 | 5/2009 | Naganuma et al. | |
| 2010/0129700 A1 | 5/2010 | Tanno | |
| 2010/0321871 A1 | 12/2010 | Diebel | |
| 2011/0095707 A1 | 4/2011 | Mehta | |
| 2011/0204843 A1 | 8/2011 | Foster | |
| 2011/0248676 A1 | 10/2011 | Kim | |
| 2012/0052337 A1 | 3/2012 | Krishnamurthi et al. | |
| 2012/0057259 A1 | 3/2012 | Yang et al. | |
| 2013/0002026 A1 | 1/2013 | Mizutani et al. | |
| 2013/0082543 A1 | 4/2013 | Tang | |
| 2014/0117784 A1 * | 5/2014 | Weissinger, Jr. | H02J 7/0026 307/150 |
| 2015/0180245 A1 | 6/2015 | Weissinger, Jr. et al. | |

FOREIGN PATENT DOCUMENTS

| | | |
|---|---|---|
| EP | 2416469 A1 | 2/2012 |
| EP | 2463985 A1 | 6/2012 |
| EP | 2506341 A2 | 10/2012 |
| GB | 2386267 A | 9/2003 |

OTHER PUBLICATIONS

International Search Report and Written Opinion for related International Patent Application No. PCT/US20130066007 dated Jan. 24, 2014.

Non-Final Office Action mailed Dec. 5, 2014, in U.S. Appl. No. 13/665,400, Weissinger, F. J. et al., filed Oct. 31, 2012.

Notice of Allowance mailed Apr. 13, 2015, in U.S. Appl. No. 13/665,400, Weissinger, F. J. et al., filed Oct. 31, 2012.

* cited by examiner

EXTERNAL ADAPTER FOR BATTERY PACK USED TO POWER A PORTABLE DEVICE

FIELD OF THE DISCLOSURE

The present disclosure relates generally to rechargeable battery packs, and more particularly to obtaining power from charge contacts of a rechargeable battery pack.

BACKGROUND

Rechargeable battery packs are used to power a wide variety of portable devices, particularly portable devices that are in frequent use and use a significant amount of power where the cost of using non-rechargeable batteries would be prohibitive. A rechargeable battery pack is a unitary packaging of an electrochemical cell or cells, connectors, contacts, circuitry, and wiring, as well as the structural elements to support those elements and to allow the rechargeable battery pack to be connected or coupled to a device in order to power the device for use. For example, portable communication devices like cellular phones and portable two-way radios are typically powered for extended periods of time so as to be able to receive communications while in use. Their power consumption rate makes the use of primary battery cells (e.g. non-rechargeable) cost prohibitive. In such applications the use of a rechargeable battery pack is preferable.

Many portable rechargeable battery packs are designed to be charged while attached to a device that is also powered by the portable rechargeable battery pack, as well as alone (not attached to a device). Accordingly, it is conventional for a portable rechargeable battery pack to have two sets of contacts: a set for providing power to the host device, and a set for charging the portable rechargeable battery pack while the portable rechargeable battery pack is attached to the host device. The set of contacts used to charge the portable rechargeable battery pack can be referred to as the charging contact set, or simply referred to as charging contacts. Charging contacts can be exposed while the portable rechargeable battery pack is attached to a host device, which can further expose them to undesirable conditions, such as short circuiting across the positive and negative charging contacts.

To address the issue of exposed charging contacts, portable rechargeable battery packs are typically provided with a charge protection means in the portable rechargeable battery pack that prevents electric current from discharging through the charging contacts, while also being operable to allow a charging current when the portable rechargeable battery pack is being recharged. For example, it is common to place a diode in series between the positive charging contact and the rechargeable battery cell(s) inside the portable rechargeable battery pack to allow charging current into the portable rechargeable battery pack and block current from discharging through the charging contacts.

There has been a continuing demand for portable devices, and hence the need for portable power. Accessories and other devices are presently available which do not need a conventional AC to DC adapter, but do not have their own power source. For example, there are a number of devices that can be powered from a computer, such as a laptop computer, via a universal serial bus (USB) of the computer. Unfortunately, because of the charge protection circuit typically used in such battery packs, the battery packs cannot be used to power accessory devices from the charging contacts.

Accordingly, there is a need for portable rechargeable battery pack, system, and external adapter that allows powering of devices through the charging contacts but without compromising the safety of charge protection at the charging contacts of a portable rechargeable battery pack.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
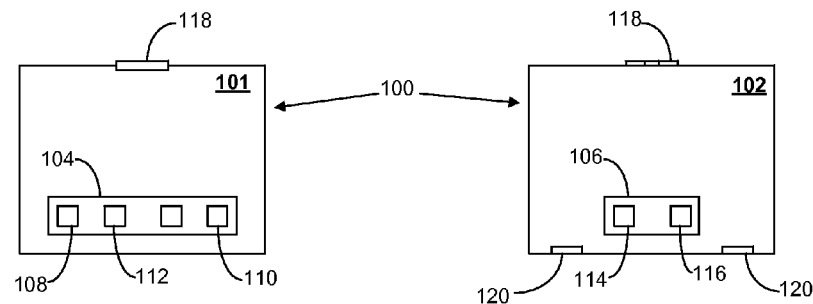
FIG. 1 shows opposing views of a portable rechargeable battery pack in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a power adapter for obtaining power from a rechargeable battery pack. The rechargeable battery pack has a set of charging contacts and a set of device or host contacts. The rechargeable battery pack contains protection circuitry to normally prevent discharge through the charging contacts. The adapter includes a set of adapter contacts, including a positive adapter contact that mates with a positive charger contact of the rechargeable battery, a negative adapter contact that mates with a negative charger contact of the rechargeable battery, and an auxiliary adapter contact that mates with an auxiliary charger contact of the rechargeable battery. The adapter further includes a battery cell connector having a positive terminal connected to the auxiliary adapter contact and a negative terminal connected to the negative adapter contact. In operation, the battery cell connector holds one or more battery cells to act as a voltage source between the auxiliary adapter contact and the negative adapter contact. The adapter further includes an external power connector having a positive external power connector terminal operably coupled to the positive adapter contact and a negative external power connector terminal operably coupled to the negative adapter contact.

FIG. 1 shows a first side 101 and an opposing second side 102 of a portable rechargeable battery pack 100 in accordance with some embodiments. First side 101 can be the back of the portable rechargeable battery pack that faces away from the host device powered by the rechargeable battery pack, and second side 102 can be the side of the portable rechargeable battery pack that interfaces with a host device. First side 101 can interface with a battery charger via a set of charger contacts 104 that are disposed on the first side 101. As used herein, the term "contact," unless otherwise indicated, refers to an electrically conductive component that is used to make physical contact with a mating electrically conductive component, and therefore provide an electrical connection. Charging contacts 104 are designed to mate with corresponding contacts of a battery charger so as to allow charging of the rechargeable battery pack. Accordingly, the charger contacts 104 include a positive charger contact 108, and a negative charger contact 110. When being charged, charge current from a battery charger enters the positive charging contact 108 and returns to the charger via the negative charger contact 110. The charging contacts 104 further includes an auxiliary contact 112 that can provide information to the charger, such as, for example, temperature information. The second side 102 comprises a set of host contacts 106 which provide power to a host device, such as a portable communication device, through a positive host contact 114 and a negative host contact 116. The rechargeable battery pack 100 can include mechanical features for attaching it to, or otherwise retaining it in a host device, such as a latch 118 and one or more retaining members 120. Although the charging contacts 104 and host contacts 106 are shown on opposing sides 101, 102 of the portable rechargeable battery pack 100, those skilled in the art will appreciate that the contacts and the portable rechargeable battery pack itself can be designed in numerous other arrangements and configurations.

In accordance with some embodiments, the rechargeable battery pack 100 is designed to be mounted or otherwise attached or disposed in a host device to provide power to the host device through host contacts 106 while, at the same time, the rechargeable battery pack and host device together can be placed in a battery charger for charging the portable rechargeable battery pack 100 through charging contacts 104. The rechargeable battery pack 100 contains a discharge protection circuit that prevents or limits current from flowing in the opposite direction of a charging current through the charging contacts. The rechargeable battery pack 100, further includes a control circuit that can disable the discharge protection circuit, and the control circuit is controlled by the application of an appropriate voltage on the auxiliary contact 112, in accordance with embodiments. By disabling the discharge protection circuit, battery voltage and current can be accessed at the charging contacts 104. However, without properly activating the control circuit via the auxiliary contact 112, the discharge protection circuit remains enabled, preventing current from discharging through the charging contacts 104.

Figure 2:
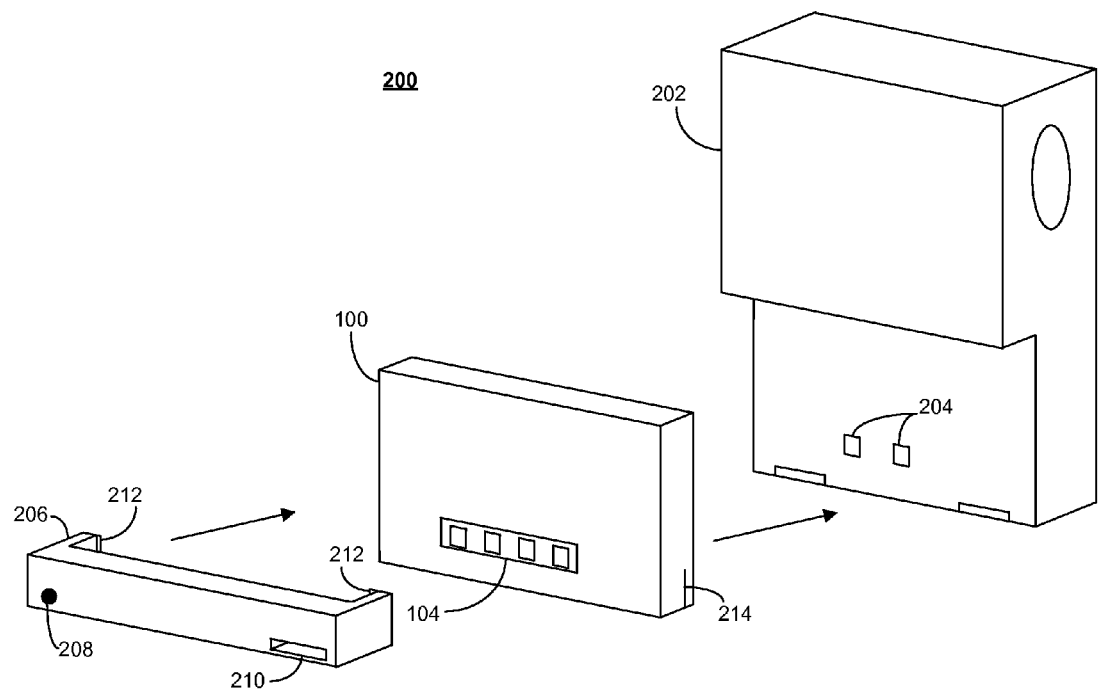
FIG. 2 is an exploded isometric view of a portable rechargeable battery pack system and a host device in accordance with some embodiments.

FIG. 2 is an exploded isometric view of a rechargeable battery pack system 200 in accordance with some embodiments. A rechargeable battery pack 100 can be mounted on or otherwise attached to a host device 202 to provide power to the host device 202 through host contacts 106 (not seen in this view) which mate with corresponding host contacts 204 on the host device 202. An external power adapter 206 is designed to mate with the rechargeable battery pack 100, and has mating adapter contacts (not seen here) that mate with at least some of the charging contacts 104. The power adapter 206 can couple to the rechargeable battery pack 100 in a detachable manner, so that it can be connected and removed from the rechargeable battery pack 100. The power adapter 206 provides a signal, such as a DC voltage level, to the auxiliary contact 112 of the rechargeable battery pack 100 to disable the discharge protection circuit so as to be able to receive power (electric current and voltage) from the rechargeable battery pack 100 through the charging contacts 104, allowing the power adapter to provide power to an external power connector, such as a female jack 208 or a USB connector 210. Thus, the rechargeable battery pack 100 can power both the host device 202 via contacts 204, and other devices via one or more external power connectors 208, 210 by disabling the discharge protection circuit in the rechargeable battery pack 100. The external power adapter 206 can have mechanical features, such as ridges 212 that correspond with grooves 214 on the rechargeable battery pack 100 to allow the external power adapter to couple or connect to the rechargeable battery pack, and retain the external power adapter 206 on the rechargeable battery pack 100.

Figure 3:
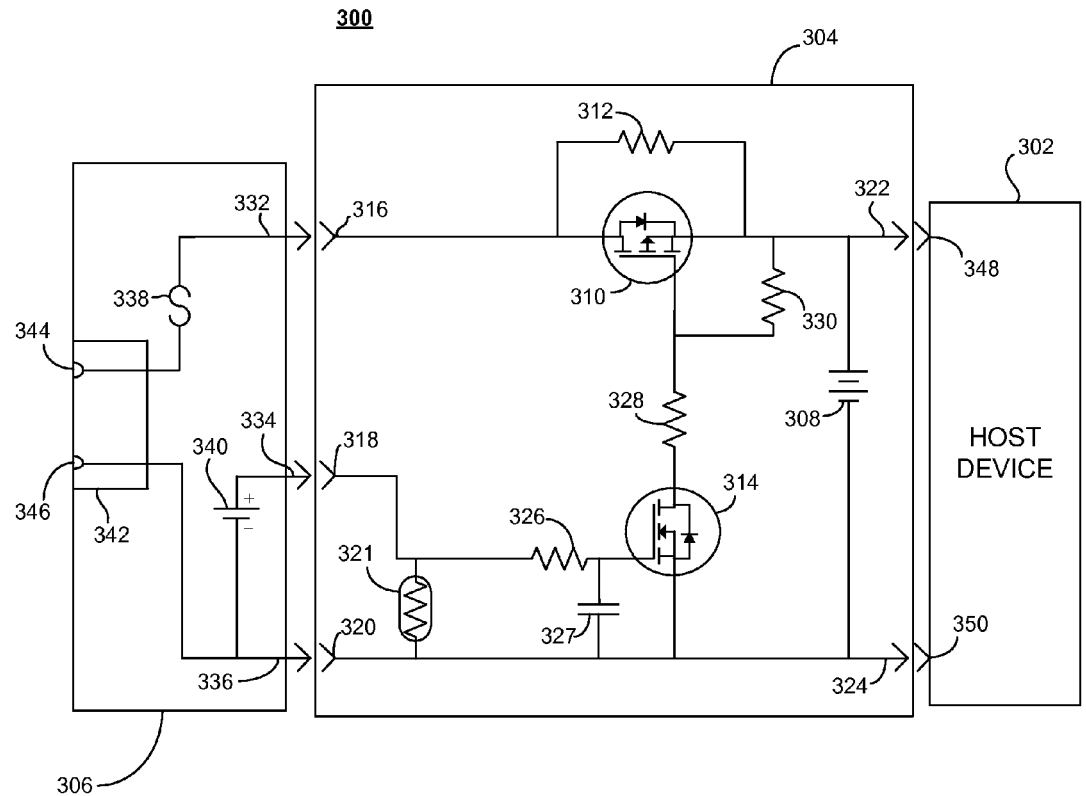
FIG. 3 is a schematic of a portable rechargeable battery pack system in accordance with some embodiments.

FIG. 3 is a schematic of a rechargeable battery pack system 300 in accordance with some embodiments. The schematic shows a host device 302, rechargeable battery pack 304, and an external power adapter 306. The rechargeable battery pack 304 contains at least one rechargeable cell 308 that is connected between host contacts 322, 324 which mate with mating host contacts 348, 350, respectively, in the host device 302. The rechargeable battery pack 304 also contains a set of charging contacts which include a positive charger contact 316, an auxiliary charger contact 318, and a negative charger contact 320. Auxiliary contact 318 can be an information contact that is connected to a thermistor 321 which can provide thermal information to a charger. The rechargeable battery pack 304 further contains a discharge protection circuit such as a transistor switch 310 coupled between the positive charger contact 316 and the rechargeable cell(s) 308. As used herein, the term "discharge protection circuit" is a circuit element that functions to allow a charge current to charge the rechargeable cell(s) 308 from the positive charging contact 316, and which normally blocks discharge current from the rechargeable cell 308 through the positive charger contact 316. The transistor switch 310 can be, for example, a P-channel metallic oxide semiconductor field effect transistor (MOSFET).

The transistor switch 310 is controlled by a control circuit including a control switch 314, that is, for example, an N-channel MOSFET, that has a control input (i.e. the gate terminal) coupled to the auxiliary charger contact 318. Signal debounce at the auxiliary charger contact 318 can be provided by series resistor 326 and capacitor 327. The auxiliary charger contact 318 is further coupled to an information element, such as thermistor 321 which provides information such as temperature information to a charger when the rechargeable battery pack 304 is connected to a charger. In such embodiments the auxiliary charger contact 318 is a thermistor contact. When the rechargeable battery pack 304 is coupled to a charger, the charger applies a voltage to the auxiliary charger contact 318 which causes switch 314 to close, pulling down the gate voltage of transistor switch 310, causing the transistor switch 310 to likewise change to a closed or low impedance state, allowing a high charge current into the rechargeable battery pack 304 to charge the rechargeable cell 308. The control switch 314 is connected to, for example, the gate of transistor switch 310. A pull up resistance 330 can operate to pull up the gate voltage when control switch 314 is open, resulting in transistor switch 310 being open. A gate resistance 328 operates to provide a voltage divider with pull up resistance 330. As used herein, the term "open" when used with regard to a switch element refer to an open circuit condition where the impedance of the device is sufficiently high as to be regarded as an open or circuit, which prevents current flow. Likewise, the term "closed" when used in regard to a switch element means a closed or "short" circuit condition where the impedance of the switch element is so low as to be regarded as a closed switch. The rechargeable battery pack 304 can, in some embodiments, include a bias resistance 312 coupled in parallel with the transistor switch 310. The bias resistance 312 allows voltage of the rechargeable cell 308 to reach the positive charger contact 316 for detection purposes, but prevent the flow of a significant current.

The power adapter 306 includes a positive adapter contact 332, an auxiliary adapter contact 334, and a negative adapter contact 336 that mate with the positive, auxiliary, and negative charging contacts 316, 318, and 320, respectively, of the rechargeable battery pack 304. The power adapter 306 further includes an external power connector 342 that can be used to provide power to devices such as accessories or other device. The external power connector 342 includes a positive contact 344 and a negative contact 346. The power adapter further includes a voltage source 340 connected between the auxiliary adapter contact 334 and the negative adapter contact 336. When the power adapter 306 is coupled to the rechargeable battery pack 304, the voltage source is connected to the auxiliary charger contact 318 via the auxiliary adapter contact 334, which switches the control switch 314 on, which in turn switches on the transistor switch 310, allowing current to flow out of the battery cell 308 into the power adapter 306 via the positive contacts 316, 332. Thus, by connecting or coupling the power adapter 306 to the rechargeable battery pack 304, power (voltage and current) can be accessed at the external power connector 342. In some embodiments a resettable fuse, such as positive temperature coefficient (PTC) device 338 can be connected in series with the external power connector 342, either between the positive adapter contact 332 and the positive connector 344, or between the negative connector 346 and the negative adapter contact 336.

Those skilled in the art will appreciate that equivalent switching arrangements can be used in place of transistors 310, 314. For example, rather than a P-channel MOSFET for transistor 310 on the positive side (between positive charger contact 316 and the rechargeable battery cell(s) 308), an N-channel MOSFET could be used between negative charger contact 320 and the rechargeable battery cell 308. Likewise, a P-channel MOSFET could then be used as switch 314 to drive the N-channel transistor switch 310 connected in a "low side" configuration.

Figure 4:
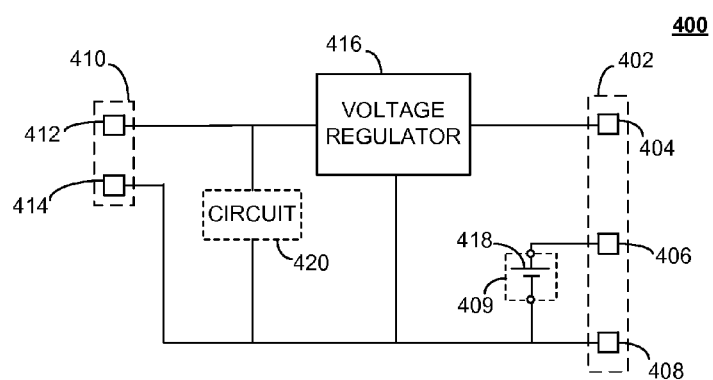
FIG. 4 is a schematic of a power adapter in accordance with some embodiments.

FIG. 4 is a schematic of a power adapter 400 in accordance with some embodiments. The rechargeable battery pack 400 includes a set of adapter contacts 402, including a positive adapter contact 404, and auxiliary adapter contact 406, and a negative adapter contact 408. In some embodiments the power adapter 400 includes a battery cell connector 409 that holds a battery cell or cells 418. The battery cell can be any variety of cell, including a coin cell, or any other cell that produces a sufficient voltage to activate a control switch in the battery pack, such as control switch 314. The power adapter can further include an external power connector 410 having positive and negative connectors 412, 414, respectively. The external power connector 410 can be any DC connector, including a USB connector, a jack connector, and so on. In some embodiments the voltage provided to the external power connector 410 can be regulated by a voltage regulator 416 connected between the external power connector 410 and the adapter contacts (i.e. positive adapter contact 404). The voltage regulator 416 can regulate the voltage provided to the external power connector 410 to a standard voltage level, such as, for example, +5V for a USB connector. The voltage regulator 416 can be passive linear regulator, or an active regulator such as a buck or boost regulator, as will be appreciated by those skilled in the art. The voltage regulator 416 can also limit current to a maximum level, and provide a shutdown function if a short circuit condition is experienced at the external power connector 410. In addition, the voltage regulator 416 can be connected in series with a PTC device, such as PTC device 338 in FIG. 3, to limit current. In some embodiments the power adapter 400 can be a self-contained device that includes a circuit or circuitry 420 that is disposed in the housing of the power adapter 400, in which case the power adapter may be referred to as by a term reflecting the function of the circuitry 420. The circuitry 420 performs a function unrelated to disabling the discharge protection of the rechargeable battery. When circuitry 420 is included, the external power connector 410 may not be present, in some embodiments both the circuitry 420 and external power connector 410 can be present in the power adapter 400.

Figure 5:
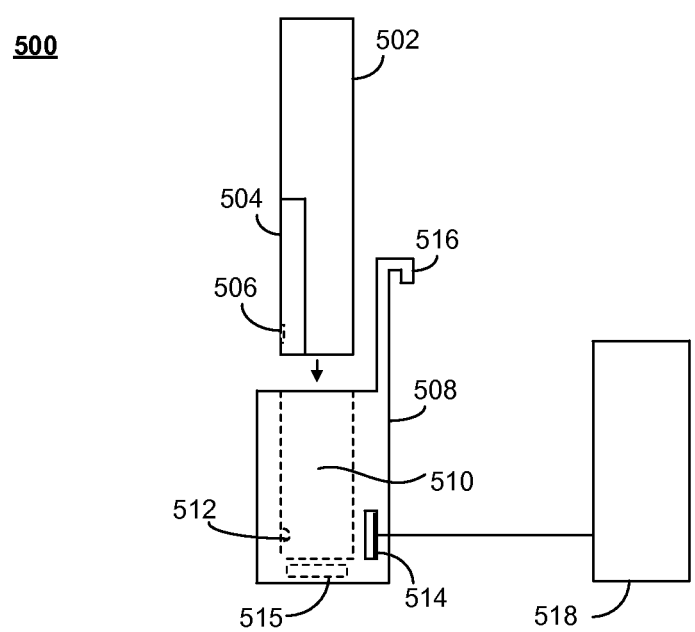
FIG. 5 is a side view a portable rechargeable battery pack system and holster containing a power adapter in accordance with some embodiments.

FIG. 5 is a side view a portable rechargeable battery pack system 500 and holster 508 containing a power adapter in accordance with some embodiments. The power adapter can be disposed in a device such as a holster 508 that is used to hold a device 502 with an attached battery 504. The device 502 can be, for example, a portable radio device, such as a portable two-way radio. The battery 504 has charger contacts 506 that are exposed. The charger contacts include a positive charger contact, an auxiliary charger contact, and a negative charger contact. The charger contacts 506 mate with adapter contacts 512 that are arranged in a pocket 510 of the holster 508, into which the device 502 and battery 506 can be inserted to be carried. The holster 508 contains the elements of the power adapter as shown in FIGS. 3-4, including a voltage source 515. Upon inserting the device 502 into the pocket 510, voltage from the voltage source 515 is applied to the control circuit in the battery, causing the control circuit to disable the discharge protection circuit and allowing current and battery voltage to be applied to an external power connector 514, consistent with the circuits shown in FIGS. 3-4. The external power connector 514 can accept a mating connector to provide power to another device. The holster 508 can comprise features for retaining the holster 508 on a user's body, such as a lip 516, and can further include clips and other retaining features, as is known in the art. Accordingly, the holster 508 allows a user of a portable device 502 to power an external device 518 from the battery 504, via the external power connected 514, that is powering the device 502 using a power adapter circuit that can be built into the holster 508.

Accordingly, the disclosed teachings relate to portable rechargeable battery packs that have both charging contacts and host contacts where the charging contacts have a charge protection means to prevent discharge current being drawn from the charging contacts. Charge current can flow through the charge contacts to charge the rechargeable cell or cells contained in the portable rechargeable battery pack, but it typically block from discharging through the charge contacts by the charge protection means. A power adapter designed in accordance with the teachings herein can access power from the rechargeable battery pack though the charging contacts via an external adapter.

Embodiments taught herein allow the ability to access power from the charging contacts of a rechargeable battery pack that is normally not possible because of the discharge protection circuit in the rechargeable battery pack the prevents discharge through the charging contacts. The power adapter embodiments both allow a user to power an additional device or devices, while ensuring no excessive current is drawn from the battery, such as in a short circuit condition. The rechargeable battery pack can then be used to power both a host device as well as one or more other devices through a power adapter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A power adapter for obtaining power from a rechargeable battery pack having a set of charging contacts and a set of device contacts, wherein the rechargeable battery pack contains protection circuitry to prevent discharge through the charging contacts, the adapter comprising:
    a set of adapter contacts including a positive adapter contact that mates with a positive charger contact of the rechargeable battery pack, a negative adapter contact that mates with a negative charger contact of the rechargeable battery pack, and an auxiliary adapter contact that mates with an auxiliary charger contact of the rechargeable battery pack;
    a battery cell connector having a positive terminal connected to the auxiliary adapter contact and a negative terminal connected to the negative adapter contact; and
    an external power connector having a positive external power connector terminal operably coupled to the positive adapter contact and a negative external power connector terminal operably coupled to the negative adapter contact.

2. The power adapter of claim 1, wherein the battery cell connector is adapted to hold a coin cell.

3. The power adapter of claim 1, wherein the external power connector is a universal serial bus (USB) connector.

4. The power adapter of claim 1, wherein the power adapter is disposed in a holster that is configured to accept a portable device to which the rechargeable battery pack is attached and align the charging contacts of the rechargeable battery pack with the adapter contacts.

5. The power adapter of claim 1, further comprising a resettable fuse connected in series with the external power connector between the external power connector and either the positive adapter contact or the negative adapter contact.

6. The power adapter of claim 1, further comprising a regulator circuit coupled in series with the external power connector configured to regulate at least one of a voltage or a current provided by the external power connector.

7. The power adapter of claim 1, wherein the auxiliary charger contact of the rechargeable battery pack is a thermistor contact.

8. The power adapter of claim 1, further comprising retaining features which hold the power adapter in place on the rechargeable battery pack.

9. A portable rechargeable battery pack system, comprising:
    a portable rechargeable battery pack having at least one rechargeable cell, a set of host contacts coupled to the at least one rechargeable cell, a set of charging contacts including a positive charger contact, a negative charger contact, and an auxiliary charger contact, a discharge protection circuit element coupled between the at least one rechargeable cell and either the positive charger contact or the negative charger contact, a control circuit coupled to the discharge protection circuit, the control circuit having an input coupled to the auxiliary charger contact, wherein the control circuit disables the discharge protection circuit element when a sufficient voltage is provided at the auxiliary charger contact; and a power adapter that mechanically couples to the portable rechargeable battery pack in a detachable manner, the power adapter having a positive adapter contact, a negative adapter contact, and an adapter auxiliary contact that mate with the positive charger contact, the negative charger contact, and the auxiliary charger contact of the portable rechargeable battery pack, respectively, the power adapter further having a voltage source coupled to the auxiliary adapter contact, the voltage source having a voltage sufficient to cause the control circuit to disable the discharge protection circuit element, and the power adapter further having an external power connector that provides power from the rechargeable battery pack when the power adapter is coupled to the rechargeable battery pack.

10. The portable rechargeable battery pack system of claim 9, wherein the discharge protection circuit element is a transistor switch, the control circuit comprises a control switch transistor having a control terminal coupled to the auxiliary charger contact.

11. The portable rechargeable battery pack system of claim 9, wherein the voltage source is a battery cell.

12. The portable rechargeable battery pack system of claim 9, wherein the battery cell is a coin cell.

13. The portable rechargeable battery pack system of claim 9, wherein the power adapter further comprises a circuit that is powered by the rechargeable battery pack and which performs a function that is unrelated to disabling the discharge protection circuit element.

14. The portable rechargeable battery pack system of claim 9, wherein the power adapter is disposed in a holster that is configured to accept a portable device to which the rechargeable battery pack is attached and align the charging contacts of the rechargeable battery pack with the adapter contacts.

15. The portable rechargeable battery pack system of claim 9, further comprising a resettable fuse connected in series with the external power connector between the external power connector and either the positive adapter contact or the negative adapter contact.

16. The portable rechargeable battery pack system of claim 9, wherein the external power adapter further include a regulator circuit coupled in series with the external power connector configured to regulate at least one of a voltage or a current provided at the external power connector.

17. The portable rechargeable battery pack system of claim 9, wherein the auxiliary charger contact of the rechargeable battery pack is a thermistor contact.

18. A holster for holding a host device having a rechargeable battery pack, the rechargeable battery pack having a set of charging contacts and a set of device contacts, the device contacts interface with the host device, the rechargeable battery pack contains protection circuitry to prevent discharge through the charging contacts, the holster comprising:

a set of adapter contacts including a positive adapter contact that mates with a positive charger contact of the rechargeable battery pack, a negative adapter contact that mates with a negative charger contact of the rechargeable battery pack, and an auxiliary adapter contact that mates with an auxiliary charger contact of the rechargeable battery pack;

a battery cell connector having a positive terminal connected to the auxiliary adapter contact and a negative terminal connected to the negative adapter contact; and an external power connector having a positive external power connector terminal operably coupled to the positive adapter contact and a negative external power connector terminal operably coupled to the negative adapter contact.

19. The holster of claim 18, further comprising a resettable fuse connected in series with the external power connector between the external power connector and either the positive adapter contact or the negative adapter contact.

20. The holster of claim 18, wherein the external power connector is connected to an external device that is powered by the external power connector.

* * * * *